United States Patent [19]

Packer et al.

[11] Patent Number: 4,612,249

[45] Date of Patent: Sep. 16, 1986

[54] BONDING POLYURETHANES TO POLYOLEFINS

[75] Inventors: Marvin Packer, Marple Township, Delaware County; John X. Fritz, E. Pikeland Township, Chester County, both of Pa.

[73] Assignee: RCA Corporation, Princeton, N.J.

[21] Appl. No.: 685,240

[22] Filed: Dec. 21, 1984

[51] Int. Cl.$^4$ .............................................. B05D 3/08
[52] U.S. Cl. ................... 428/424.8; 427/195; 427/202; 427/203; 427/223; 427/224; 427/302; 427/322; 427/412.3; 428/424.4; 428/500; 428/520; 428/522; 428/523
[58] Field of Search ............... 427/224, 222, 195, 203, 427/202, 412.3, 302, 322; 428/424.8, 424.4, 500, 520, 522, 523

[56] References Cited

U.S. PATENT DOCUMENTS

| | | | |
|---|---|---|---|
| 2,923,640 | 2/1960 | Buckingham | 427/224 |
| 3,023,126 | 2/1962 | Underwood et al. | 117/76 |
| 3,198,692 | 2/1963 | Bridgeford | 161/188 |
| 3,326,742 | 6/1967 | Shepherd | 427/322 |
| 3,511,682 | 5/1970 | Sands | 427/224 |
| 3,970,771 | 7/1976 | Davison | 428/424.8 |
| 4,302,272 | 11/1981 | Phillips et al. | 156/309.9 |
| 4,311,745 | 1/1982 | Civardi | 428/91 |
| 4,337,296 | 6/1982 | Varadhachary | 428/420 |
| 4,419,408 | 12/1983 | Schmulker et al. | 428/424.8 |
| 4,430,135 | 2/1984 | Schmulker et al. | 427/195 |
| 4,432,820 | 2/1984 | Thompson | 156/82 |
| 4,444,975 | 4/1984 | Pokorny | 528/49 |

*Primary Examiner*—John D. Smith
*Assistant Examiner*—Janyce A. Bell
*Attorney, Agent, or Firm*—B. E. Morris; R. Hain Swope

[57] ABSTRACT

A process of bonding a coating of a polyurethane resin to a polyolefin substrate is provided. The polyolefin substrate is coated with a graft copolymer of a polyolefin and a functional monomer such as acrylic acid. The graft copolymer is flame treated to fuse it. A liquid polyurethane precursor composition is then applied thereto and cured.

11 Claims, No Drawings

BONDING POLYURETHANES TO POLYOLEFINS

This invention relates to an improvement in bonding a polyurethane resin to a polyolefin. The United States Government has rights to this invention.

BACKGROUND OF THE INVENTION

In general, polyolefins, such as polyethylene and polypropylene, do not bond to polyurethanes with sufficient strength, resiliency, resistance to water damage and the like for many fabrication applications. For applications such as the production of multilayer sheeting, cables and other similar articles, the bond between different resins must be environmentally stable and able to withstand substantial mechanical stresses. Heretofore, it has generally not been possible to make such a bond between polyolefins and polyurethanes.

SUMMARY OF THE INVENTION

A polyurethane resin is bonded to a polyolefin substrate by first coating the polyolefin with a graft copolymer of a polyolefin and a functional monomer, flame treating the copolymer surface, then applying a liquid polyurethane precursor composition and curing the coating.

DETAILED DESCRIPTION OF THE INVENTION

The polyolefin substrate to be bonded in accordance with this invention may be any of the linear polymers of relatively simple olefins, such as polyethylene, polypropylene, polybutene and the like. The particular properties of the polymers contemplated herein are of importance to the ultimate use of the structure, but are not critical to the method of this invention. Generally, a polyolefin substrate as contemplated herein would have a molecular weight of at least about 150,000.

In accordance with the subject process, the polyolefin, e.g. polyethylene or polypropylene, is initially fabricated to the desired configuration of the final structure, e.g. a sheet, a rod and the like, by any art-recognized technique, e.g. injection molding. At least the portion of the polyolefin substrate to be bonded to the polyurethane resin is then coated with a composition comprising a graft copolymer of a polyolefin and a functional monomer, and a suitable organic solvent. The solvent is evaporated, suitably by air drying, to form a coating of the graft copolymer.

The graft copolymers coated onto the polyolefin substrate in the subject process are known and are commercially available, for example, under the trademark Polybond from Reichhold Chemical, Inc., Hackettstown, N.J. They are prepared by grafting a functional monomer such as an acylate monomer, e.g. acrylic acid, onto the backbone of a polyolefin such as polyethylene or polypropylene. The resulting graft copolymers are useful in filler and adhesive applications. A preferred graft copolymer is polyethylene having about six percent by weight of acrylic acid grafted thereto. It is significant that, although a coating of the graft copolymers of polyolefin and functional monomer contemplated herein will bond polyolefins such as polyethylene to certain metals, they will not bond polyolefins to polyurethanes to the degree provided by the subject process.

In accordance with this invention, the coating of the graft copolymer is flame treated by being briefly brought in close proximitry to a flame. The technique of flame treating a polyolefin to make the surface more polar is well known in the art, although the exact mechanism is not known with certainty. It is significant, however, that conventional flame treatment of the polyolefin substrate has not been effective in improving adherence of polyurethanes thereto.

The graft copolymer coating on the polyolefin surface is flame treated by passing near an oxidizing flame for a time sufficient to fuse the coating. This is evidenced by a change in the appearance thereof, e.g. from a particulate, powdery coating to a fused, shiny mass. This generally requires only a few seconds, i.e. from 5 to 10, preferably about 7, seconds. The coating is suitably placed about one inch from the flame. The flame treatment may be carried out by manually rotating the coated polyolefin structure near a burner flame, or passing cylindrical structures through one or more ring burners at a predetermined rate, passing flat structures on a suitable conveyer under a series of burner, and the like. It is necessary only that the flame treatment is carried out for a sufficient time to fuse the graft copolymer coating onto the polyolefin surface.

The coated polyolefin substrate is then coated by any conventional technique with a suitable liquid polyurethane precursor composition which conventionally includes an isocyanate component, a polyol component and a suitable catalyst. The isocyanates conventionally included in suitable preparations contemplated herein are aliphatic or cycloaliphatic isocyanates containing at least two isocyanate groups, for example, 4,4'-methylene-bis-cyclohexyl diisocyante, hexamethylene-1,6-diisocyanate, cyclohexane-1,4-diisocyanate, 4,4'-methylene-bis-(phenylisocyanate), isopherone diisocyanate, toluene diisocyanate and the like.

The polyol component of the polyurethane precursor compositions contemplated herein can be an aliphatic or cycloaliphatic polyol containing from two to four functional groups. Typical members of this art-recognized group of compounds includes ethylene glycol, butadienediol, 1,1,1-trimethylol propane, 1,2,3-butanetriol, erythritol, pentaerythritol, adducts of such polyols with alkylene oxides having from 2 to 5 carbon atoms such as ethylene oxide, propylene oxide, and the like, condensation products of such polyols with polycarboxylic acids such as oxalic acid, phthalic acid and the like, or polyamines such as ethylene diamine, hexamethylene diamine and the like.

The catalyst component of the polyurethane precursor compositions contemplated herein is one or more free radical polymerization initiators such as organic peroxides, e.g., di-t-butyl peroxide, benzoyl peroxide, t-butyl-peroxymaleic acid and the like, tetravalent tin compounds, metal acetyl acetonates and organo mercury compounds. The organic peroxides are generally preferred.

Typical commercial polyurethane precursor compositions contain one or more isocyanates, optionally with one or more polyols as a first component and one or more polyols in combination with a catalyst as a second component. Such compositions to be suitable for use in this invention, must be in liquid form or combine to form a liquid. This liquid pottant is applied to the coated polyolefin substrate, suitably by immersion therein. In a typical composition commercially available as EN 11 from Conap Corporation, the first component is a prepolymer of toluene diisocyanate and butadienediol and the second component contains an additional polyol plus a catalyst.

The polyurethane precursor composition is cured according to the recommended procedure to form a strongly adherent polyurethane layer. In general, such reactive compositions are cured at from about 60° to about 100° C. for from 12 to 24 hours. These limits are given for illustration only and may not apply to every such composition.

It is considered unexpected that flame treating the graft copolymer coating of this invention produces a superior bond between the polyolefin substrate and the polyurethane coating because flame treatment of the polyolefin itself is ineffectual. The bond produced in accordance with the subject method possesses exceptional strength and has been found to meet all criteria for environmental stability. The method of this invention is further advantageous in that a polyurethane precursor composition is utilized which does not contain a solvent. In addition, the polyurethane coating formed in accordance with this invention may be of any desired thickness without losing adhesion. The coating may be increased to a desired thickness by repeated application and curing of the polyurethane precursor composition.

The following Examples further illustrate this invention, it being understood that the invention is in no way intended to be limited to the details described therein. In the Examples, all parts and percentages are on a weight basis and all temperatures are in degrees Celsius, unless otherwise stated.

CONTROL A

Polyethylene rods, 1 inch in diameter and 6 inches in length, were suspended perpendicularly in a 100 ml laboratory beaker. The beaker was filled to a depth of 1.2 inches with the commercial polyurethane precursor composition EN11. The two components of this composition were mixed according to the manufacturer's instructions just prior to use. The resin preparation was allowed to cure over a period of 16 hours at 65°, followed by 3 hours at 80°.

The coated ends of the rods were uniformly cut so that only one inch of each rod was coated with the cured polyurethane. The rods were placed in an Instron Testing Instrument and pulled at the rate of 2 inches per minute. The point in pounds of pull force at which the polyurethane separated from the polyethylene is indicative of the strength of the bond. Two such rods separated at a pull force of 144 and 155 pounds, respectively. These results are unacceptable.

CONTROL B

A second group of two polyethylene rods were treated as was Control A except that the area to be coated with the polyurethane was conventionally flame-treated, i.e. the rod was rotated approximately one inch from an open flame for about seven seconds prior to coating with the polyurethane precursor composition as described in Control A. The bond between the polyurethane coating and the polyethylene rod separated at approximately 60 pounds in each instance, an unacceptable result.

CONTROL C

A polyethylene rod was prepared for coating with the polyurethane precursor composition of Control A by abrading the area to be coated manually with 200 grit carborundum paper. The polyurethane coating, applied as described in Control A, separated at 194 pounds.

CONTROL D

Three polyethylene rods were prepared for polyurethane coating by immersing the area to be coated in standard chromic acid oxidizing solution, i.e. two percent by weight of chromic acid in surfuric acid, for 4, 10 and 30 seconds, respectively. The rods were coated with the polyurethane precursor composition which was then cured as in Control A. The coatings separated from the rods at 225 pounds, 270 pounds and 290 pounds, respectively. Although an improvement over the coatings in the previous Controls, these results are not considered acceptable.

CONTROL E

A group of three polyethylene rods was coated with Polybond 95-723, a graft copolymer of polyethylene and 6 percent of acrylic acid. The copolymer was applied as a 39 percent dispersion in xylol which was air-dried at ambient temperature over a period of 30 minutes. The coated portion of the rods was rotated 2-3 inches from a hot air blower set on a low setting for about three minutes. The temperature of the air stream was about 85°. The polyurethane precursor composition was then applied to the coated portion of the rod and cured as in the previous Controls. The polyurethane coatings separated at 320, 300 and 300 pounds, respectively.

CONTROL F

A group of three polyethylene rods was coated with the polyethylene/acrylic acid graft copolymer dispersion as described in Control E. The coatings were air-dried for thirty minutes. The rods were then placed in a preheated oven and baked at 85° for thirty minutes. The polyurethane precursor composition was applied to the coated portion of the rods and cured as in the previous Controls. The polyurethane coatings separated at 320, 310 and 300 pounds, respectively. The results of Controls E and F, although a further improvement, are still considered unacceptable.

EXAMPLE 1

A group of three polyethylene rods was coated with the graft copolymer dispersion which was air-dried as described in Control E. The copolymer coating was flame-treated as described in Control B. The flame-treated portion was coated with the polyurethane precursor composition which was cured as described in Control A. One of the rods separated at 460 pounds. At 500 pounds, the coating on the remaining rods slipped from the gripping jaws of the test instrument. The polyurethane coating was completely intact in both instances. These results clearly demonstrate the unexpectedly superior bond achieved in accordance with the method of this invention.

We claim:

1. A process for producing a bond between a polyolefin substrate and a polyurethane comprising:
    (a) forming on the polyolefin substrate a coating consisting essentially of a graft copolymer of a polyolefin and an acrylate monomer;
    (b) flame treating the coating for a time sufficient to fuse the graft copolymer to the substrate;
    (c) applying to said fused coating a liquid polyurethane precursor composition; and (d) curing said composition.

2. A process in accordance with claim 1, wherein the polyolefin substrate is polyethylene or polypropylene.

3. A process in accordance with claim 2, wherein the polyolefin substrate is polyethylene.

4. A process in accordance with claim 1, wherein the graft copolymer is of polyethylene and acrylic acid.

5. A process in accordance with claim 4, wherein the graft copolymer contains about six percent by weight of acrylic acid.

6. A process in accordance with claim 1, wherein the graft copolymer coating is flame treated for from about 5 to about 10 seconds.

7. A process in accordance with claim 1, wherein the polyurethane precursor composition includes an aliphatic or cycloaliphatic isocyanate containing at least two isocyanate groups.

8. A process in accordance with claim 1, wherein the polyurethane precursor composition includes an aliphatic or cycloaliphatic polyol containing from two to four functional groups.

9. A process in accordance with claim 1, wherein the polyurethane precursor composition is cured by heating to a temperature of from about 60° to about 100° C.

10. A process in accordance with claim 1, wherein steps (c) and (d) are repeated one or more times to form a polyurethane coating of a predetermined thickness.

11. A coated polyolefin substrate produced by the process of claim 1.

* * * * *